UNITED STATES PATENT OFFICE.

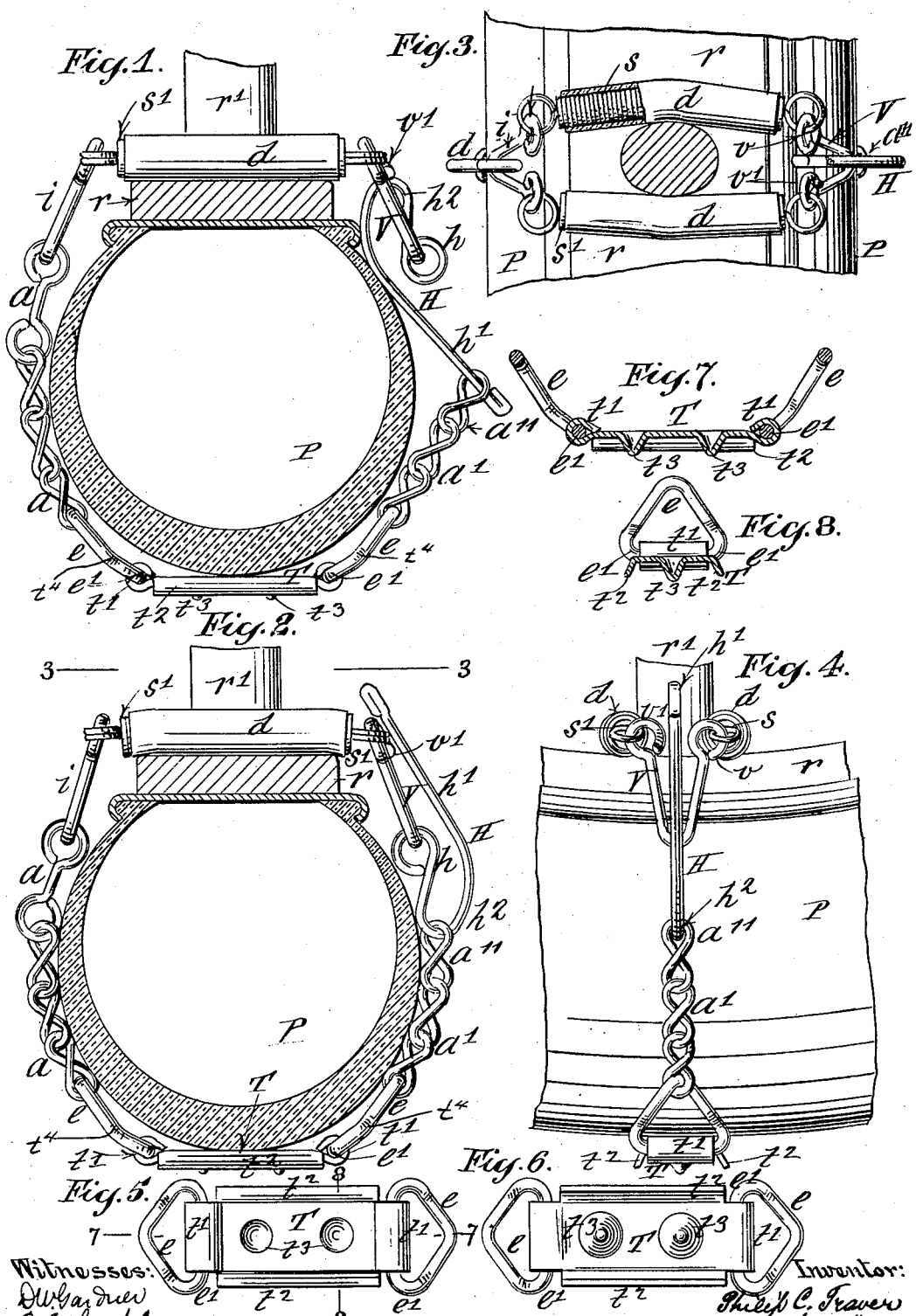

PHILIP C. TRAVER, OF FAR ROCKAWAY, NEW YORK, ASSIGNOR, BY DIRECT AND MESNE ASSIGNMENTS, TO PEARSALL-TRAVER MANUFACTURING COMPANY, A CORPORATION OF NEW YORK.

ANTISKIDDING DEVICE FOR WHEEL-TIRES.

969,425.  Specification of Letters Patent.  Patented Sept. 6, 1910.

Application filed September 9, 1909. Serial No. 516,829.

*To all whom it may concern:*

Be it known that I, PHILIP C. TRAVER, a citizen of the United States, residing at Far Rockaway, Queens county, and State of New York, have invented certain new and useful Improvements in Antiskidding Devices for Wheel-Tires, of which the following is a specification.

My improvements relate to devices for preventing the skidding of wheels provided with wheel tires. As ordinarily constructed and used, these devices consist of a pair of circumferential anchor chains having a series of transverse ligatures to which are attached tread plates, the whole forming a comparatively heavy structure and occupying considerable space when not in use.

It is the object of my invention to obviate this objection by dispensing with the circumferential anchor chains, and providing individual spoke anti-skids, any desired number of which may be quickly and conveniently applied in emergency.

The invention consists in the specific construction and arrangement of parts hereinafter described and claimed, distinguishing features being the resilient means for coupling the parts together; and the form of tread plate used, substantially as set forth.

In the accompanying drawings, Figure 1, is a cross section of a pneumatic tire, wheel rim, &c., showing my improved anti-skidding device in elevation but unfastened; Fig. 2, is a similar view showing the device locked in position; Fig. 3, is a section upon plane of line 3—3— Fig. 2, showing a top view of my device; Fig. 4, is a side elevation of the parts as seen in Fig. 2; Figs. 5 and 6, are respectively inner and outer face views of the tread plate; Fig. 7, is a longitudinal section upon plane of line 7—7— Fig. 5; Fig. 8, is a transverse section upon plane of line 8—8— Fig. 5.

In the drawings P, represents the pneumatic tire, $r$, the rim, and $r'$, a spoke of an automobile wheel.

The tread plates T, are peculiar in that they are stamped out of sheet steel, are in one piece, and have end flanges $t'$, which are bent over the base members $e'$, of the triangular links $e$, to which the flexible ligatures $a$, $a'$, are attached. In fact these triangular links $e$, practically form an essential part of the tread plates, being incorporated therewith during the manufacture of the tread. It is to be noted that the loop flanges $t'$, are bent over backward away from the face of the tread plate, thereby causing the rear of the tread plate to conform approximately to the contour of the pneumatic tire, substantially in the manner set forth in my concurrent application No. 517301 filed September 11, 1909. It will be seen that the tread plates T are of elongated rectangular shape and are formed with the parallel outwardly projecting flanges $t^2$, $t^2$, on their longitudinal edges, and with central conical tits or protuberances $t^3$, $t^3$, of a depth equal to that of the flanges $t^2$, $t^2$.

The flexible ligatures $a$, $a'$, preferably consists of articulated chain links, although other flexible ligatures may be used if preferred. One ligature $a$, is attached permanently to a rectangular link $i$, being linked to the apex thereof. To the base member of this triangular link $i$, is connected the ends of two coiled springs $s$, $s'$, made preferably of piano wire of suitable strength and resilience. One of these springs $s$, is connected at its other extremity to a loop $v$, of a V-shaped coupling link V,—the other end of the coupling link V, being formed with a hook $v'$, for engagement with the looped end of the other spring $s'$. Thus the spring $s'$, may be unhooked from the V-shaped coupling link V, for the purpose of passing the springs $s$, $s'$, into the position shown in Fig. 3, with the spoke $r'$, between them; spring $s'$, being then re-hooked as shown.

Connected by a loop $h$, to the V-shaped coupling link V, is the coupling hook lever H, the arm $h'$, of which is passed through the link $a''$, of the ligature $a'$, and then raised to bring said link $a''$, into the bight or bearing $h^2$. Any other form of hook may be substituted for the coupling hook lever H, if preferred, although the latter, by the leverage which may be exerted thereby is adapted to facilitate the act of coupling the parts together against the resistance of the springs $s$, $s'$. It is obvious that strong rubber springs or other equivalent mechanical expedients might be substituted for the coiled wire springs with like effect,—the springs performing the double function of resilient means for holding the device taut in position, and of straddling the spoke r', to maintain the position and alinement of the anti-skid.

It is obvious that any number of these individual spoke anti-skids may be arranged upon and around a wheel as may be found expedient, limited only by the number of spokes in the wheel; and whatever the number applied they should obviously be arranged at equidistant points around the tire when practicable.

My individual spoke anti-skid, is designed primarily as an emergency anti-skid, and the quickness and facility with which it may be applied adapts it for instant use.

In order to protect the surface and finish of the spoke where coiled metallic springs are used, I incase said springs in sections of rubber tubing $d$, $d$, as shown in Fig. 3, or equivalent flexible material that will yield to allow of the expansion and contraction of the springs.

It is to be understood that while I have herein shown my anti-skid as applied to a pneumatic tire by way of illustration, I do not confine myself to that form of tire, since the device may be used on solid and other forms of tires with like effect.

What I claim as my invention and desire to secure by Letters Patent is—

1. An anti-skidding device comprising a tread plate, flexible ligatures connected with opposite ends thereof, links elastically connected together and one connected with one of said ligatures, a coupling hook lever, and the other coupling link and coupling hook lever connected to the other ligature, said lever having a bight in which the adjacent connection is loosely movable on the upward movement of the free arm of the lever.

2. An anti-skid device of the character described, consisting of a tread plate, a flexible ligature connecting therewith and connecting it with two coiled metallic springs, a coupling link attached to one spring and formed with a hook for engagement with a loop on the other spring, said coiled metallic springs adapted to extend on opposite sides of a wheel spoke, rubber tubes incasing the said springs, a coupling hook loosely connected with the coupling link and bodily movable therein, and another flexible ligature connected with the tread plate and formed with a loop adapted to engage with the coupling hook on the coupling link, substantially in the manner and for the purpose described.

3. An anti-skid device comprising a tread plate, flexible ligatures connected with opposite ends thereof, a pair of independent springs to extend on opposite sides of a spoke, triangular links connected with the ends of said springs, one of said links being connected with one of said ligatures, and a coupling hook lever linked at one end to the other link and having its free arm passed loosely through a link on the other ligature, said lever having a bight into which the last-named link is placed by the upward movement of the free arm of said lever.

PHILIP C. TRAVER.

Witnesses:
D. W. GARDNER,
GEO. WM. MIATT.